United States Patent
Sukhija et al.

(10) Patent No.: US 11,101,045 B2
(45) Date of Patent: Aug. 24, 2021

(54) SPATIO-TEMPORAL TRANSFER LEARNING BETWEEN IOT ECOSYSTEMS

(71) Applicant: International Business Machines Corporation, Armonk, NY (US)

(72) Inventors: Sandeep Sukhija, Noida (IN); Vijay Kumar Ananthapur Bache, Bangalore (IN); Harish Bharti, Pune (IN); Vijay Ekambaram, Chennai (IN)

(73) Assignee: International Business Machines Corporation, Armonk, NY (US)

(*) Notice: Subject to any disclaimer, the term of this patent is extended or adjusted under 35 U.S.C. 154(b) by 10 days.

(21) Appl. No.: 16/693,335

(22) Filed: Nov. 24, 2019

(65) Prior Publication Data
US 2021/0157587 A1  May 27, 2021

(51) Int. Cl.
*G06F 15/177* (2006.01)
*G16Y 40/10* (2020.01)
*G16Y 20/40* (2020.01)
*G06F 16/9035* (2019.01)

(52) U.S. Cl.
CPC .......... *G16Y 40/10* (2020.01); *G06F 16/9035* (2019.01); *G16Y 20/40* (2020.01)

(58) Field of Classification Search
CPC ...... G16Y 40/10; G16Y 20/40; G06F 16/9035
USPC ....................................................... 709/220
See application file for complete search history.

(56) References Cited

U.S. PATENT DOCUMENTS

| | | | |
|---|---|---|---|
| 2011/0302282 A1* | 12/2011 | Dadlani Mahtani | H05B 47/19 709/221 |
| 2014/0241354 A1* | 8/2014 | Shuman | H04L 12/281 370/390 |
| 2014/0244834 A1* | 8/2014 | Guedalia | H04W 4/21 709/224 |
| 2015/0121470 A1* | 4/2015 | Rongo | H04L 12/2807 726/4 |
| 2017/0006595 A1* | 1/2017 | Zakaria | H04W 4/80 |
| 2017/0171180 A1* | 6/2017 | Britt | H04W 12/084 |
| 2017/0171728 A1* | 6/2017 | Aiuto | H04W 76/10 |

FOREIGN PATENT DOCUMENTS

WO  2018081611 A1  5/2018

OTHER PUBLICATIONS

"Unsupervised Feature Learning and Deep Learning Tutorial", downloaded from the internet Nov. 5, 2019, <http://ufldl.stanford.edu/tutorial/unsupervised/Autoencoders/>, 6 pages.

(Continued)

*Primary Examiner* — Atta Khan
(74) *Attorney, Agent, or Firm* — Monchai Chuaychoo

(57) ABSTRACT

The approach is for cognitively transferring IoT configurations between similar IoT ecosystems based on several factors. The approach scans IoT devices from a first and a second IoT ecosystem and extracts user data from the first and the second IoT ecosystem. The approach compares the first IoT ecosystem against the second IoT ecosystem and determines if the first IoT ecosystem is similar to the second IoT ecosystem. If the first and second IoT ecosystem are similar, then transfer data from the first IoT ecosystem to the second IoT ecosystem.

20 Claims, 5 Drawing Sheets

(56) References Cited

OTHER PUBLICATIONS

Al-Garadi, et al., "A Survey of Machine and Deep Learning Methods for Internet of Things (IoT) Security", Department of Computer Science and Engineering, Qatar University, downloaded from the internet Nov. 5, 2019, provided by searcher in report dated Jul. 9119, 42 pages, <https://arxiv.org/pdf/1807.11023>.
Chatterjee, Sharmistha, "Ensemble Transfer Learning for IoT—Present and Future Research", downloaded from the internet on Nov. 5, 2019, 18 pages, <https://towardsdatascience.com/ensemble-transfer-learning-for-iot-present-and-future-research-76dde61ee0d0>.
Deniz, Dr. Taskin, IoT Learning Algorithms and Predictive Maintenance—1 : A thought experiment, Record Evolution in IoT & Data Science May 28, 2018, 11 pages.
Ghosh et al., "Artificial Intelligence in Internet of Things" CAAI Transactions on Intelligence Technology, 2018, vol. 3, Iss. 4, pp. 208-218, ISSN 2468-2322, Received on Jul. 6, 2018, Revised on Sep. 27, 2018, Accepted on Oct. 8, 2018, doi: 10.1049/trit.2018.1008, <www.ietdl.org>.

\* cited by examiner

SPATIO-TEMPORAL TRANSFER LEARNING BETWEEN IOT ECOSYSTEMS

BACKGROUND

The present invention relates generally to the field of computer software, and more particularly to leveraging IoT (Internet of Things) integration between different platforms.

IoT devices, typically are nonstandard computing devices that connect wirelessly to a network and have the ability to transmit data back and forth. IoT devices involves extending internet connectivity beyond standard devices (e.g., desktops, laptops, smartphones, etc.) to non-internet-enabled physical devices and everyday objects.

IoT orchestration integrates separate systems, software, and sensors including IoT devices into a single management platform. An orchestration platform and framework allows users to easily view, manage, and set automated rules for existing IoT devices within the platform or ecosystem.

SUMMARY

Embodiments of the present invention disclose a computer-implemented method, computer program product and a computer system for transferring configuration between IoT ecosystems. A computer-implemented method comprising: scanning IoT devices from a first and a second IoT ecosystem; extracting user data from the first and the second IoT ecosystem; comparing the first IoT ecosystem against the second IoT ecosystem; determining if the first IoT ecosystem is similar to the second IoT ecosystem; and responsive to the first and second IoT ecosystem being similar, transfer data from the first IoT ecosystem to the second IoT ecosystem.

DETAILED DESCRIPTION

Figure 1:
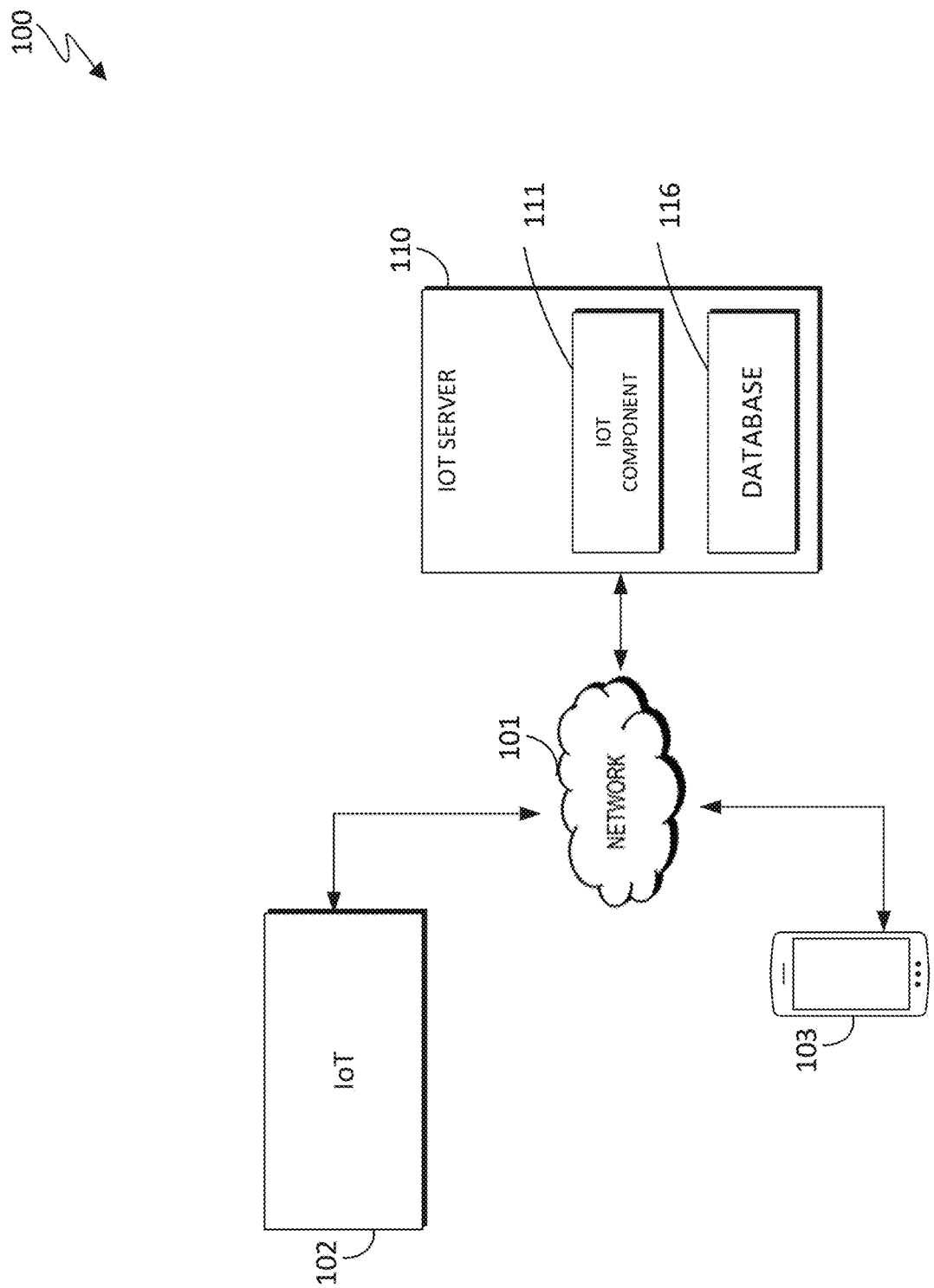
FIG. 1 is a functional block diagram illustrating a topology of an IoT interoperability environment, designated as 100, in accordance with an embodiment of the present invention.

Embodiments of the present invention provides a framework of transferring system and all configurations (including custom configuration) by the user between similar IoT ecosystems. Configurations based on user's events, can include i) user's behavior-based pattern and ii) user profile matching based pattern. Custom configuration can be defined as a user-define event pattern. The framework will have IoT Orchestration database populated with available API's enabled with various features provided by manufacturer, user's own IoT space in cloud capturing device detail and user's IoT orchestration pattern detail.

The present embodiment is based on a cognitive (e.g., artificial intelligence, neural network, etc.) framework to automate user's IoT device communication capability based on similarities in user's events. While finding the similarities (between the ecosystems), the framework will automate IoT communication by factoring (a) user's events based on user's behavior events, (b) event's automated by other connection over social media and (c) user's own defined event automation. This framework provides a model to enable spatio-temporal transfer learning between IoT ecosystems for user's IoT device automation based on IoT embedding representation similarities (with other users) which will be fed by user's events based on user's behavior based pattern, user profile matching based pattern and user-define event pattern. The framework will have IoT Orchestration database populated with available API's enabled with various features provided by manufacturer, user's own IoT space in cloud capturing device detail and user's IoT orchestration pattern detail.

In another embodiments, the system can be enabled for spatio-temporal transfer learning between IoT ecosystems based on IoT embedding representation similarities (with other users) correlated with underlying use-cases (spatio-temporal aligned) for personalized and opportunistic auto-discovery of appropriate IoT orchestration configs, best practices to enable in user's smart home.

A detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

FIG. 1 is a functional block diagram illustrating a topology of an IoT interoperability environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

IoT interoperability environment 100 includes IoT device 102, mobile computing device 103 and IoT server 110. All (e.g., 102 and 110) elements can be interconnected over network 101.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between IoT server 110 and other computing devices (not shown) within IoT interoperability environment 100. It is noted that other computing devices can include, but is not limited to, IoT device 102 and any electromechanical devices capable of carrying out a series of computing instructions.

IoT device 102 represents a system of interrelated (non-standard or standard) computing devices, mechanical and digital machines, objects, etc., that are provided with unique identifiers (UIDs) and the ability to transfer data over a network (e.g., wireless or wired) without requiring human-to-human or human-to-computer interaction. IoT device can be a smart lighting, smart thermostat, door lock device, home automation related device, or any programmable electronic device capable of communicating with server computers (e.g., IoT server 110) via network 101, in accordance with an embodiment of the present invention.

Mobile computing device 103 represents a network capable mobile computing device that may receive and transmit confidential data over a wireless network. Mobile computing device 103 can be a laptop computer, tablet computer, netbook computer, personal computer (PC), a personal digital assistant (PDA), a smart phone, smart watch (with GPS location) or any programmable electronic device capable of communicating with server computers (e.g., IoT server 110) via network 101, in accordance with an embodiment of the present invention.

IoT server 110 can be a standalone computing device, a management server, a web server, a mobile computing device, or any other electronic device or computing system capable of receiving, sending, and processing data. In other embodiments, IoT server 110 can represent a server computing system utilizing multiple computers as a server system, such as in a cloud computing environment. In another embodiment, IoT server 110 can be a laptop computer, a tablet computer, a netbook computer, a personal computer (PC), a desktop computer, a personal digital assistant (PDA), a smart phone, or any other programmable electronic device capable of communicating other computing devices (not shown) within 100 via network 101. In another embodiment, IoT server 110 represents a computing system utilizing clustered computers and components (e.g., database server computers, application server computers, etc.) that act as a single pool of seamless resources when accessed within IoT interoperability environment 100.

IoT server 110 includes IoT component 111 and database 116.

IoT component 111 enables the present invention to communicate, manage and organize transference of IoT configurations (e.g., orchestration configurations, best practices, user defined/custom configurations, etc.) between similar IoT ecosystems through a framework. The framework can install/update thin client on all the IoT devices of the user from user's IoT orchestration ecosystem. The thin client will be updated on all the devices whenever there is a change in IoT Orchestration rule of the user. These devices will be able to interact with each other based on commutation instructions installed on thin client installed.

Subcomponents of IoT component 111 will be described in greater details in regard to FIG. 2.

Database 116 is a repository for data used by IoT component 111. Database 116 can be implemented with any type of storage device capable of storing data and configuration files that can be accessed and utilized by IoT server 110, such as a database server, a hard disk drive, or a flash memory. Database 116 uses one or more of a plurality of techniques known in the art to store a plurality of information. In the depicted embodiment, database 116 resides on IoT server 110. In another embodiment, database 116 may reside elsewhere within IoT interoperability environment 100, provided that IoT component 111 has access to database 116. Database 116 may store information associated with, but is not limited to, corpus knowledge of all IoT device capability including specifications, IoT orchestration rules, user configuration and IoT best practices.

Figure 2:
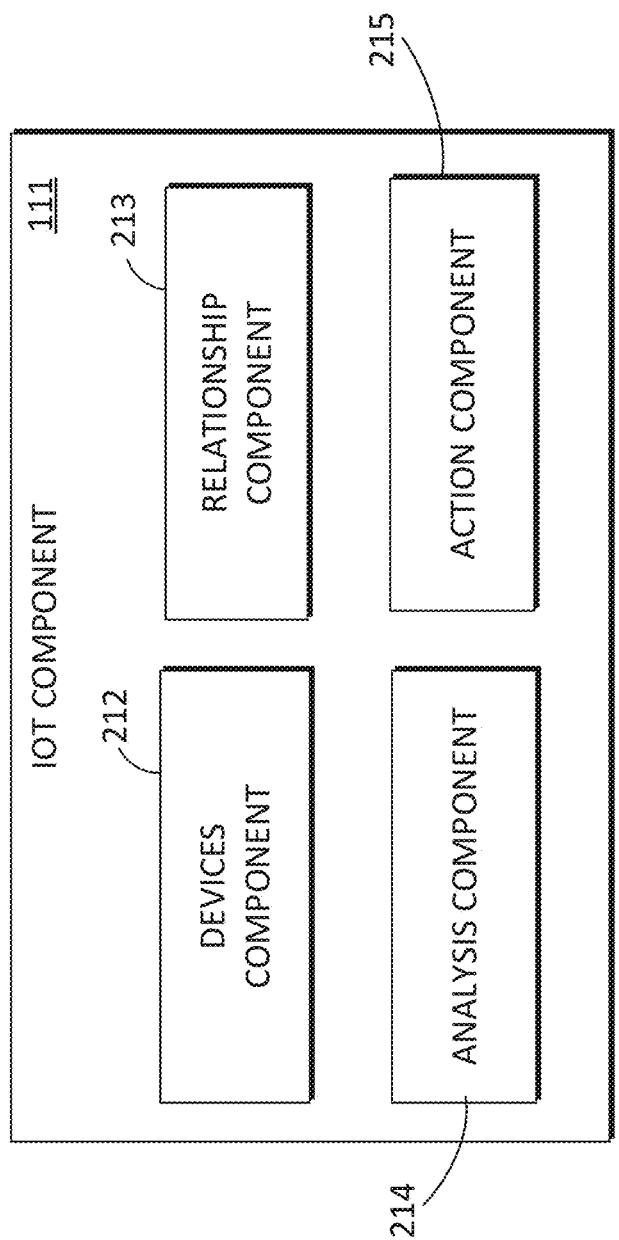
FIG. 2 is a functional block diagram illustrating IoT component in accordance with an embodiment of the present invention.

FIG. 2 is a functional block diagram illustrating IoT component 111 in accordance with an embodiment of the present invention. In the depicted embodiment, IoT component 111 includes devices component 212, relationship component 213, analysis component 214 and action component 215. It is noted that IoT component 111 can be utilized in a centralized or de-centralized software system with an application (front end interface) on mobile computing devices and a backend on the server.

As is further described herein below, devices component 212, of the present invention provides the capability of determining available IoT devices within an ecosystem (e.g., user's home, hospital, airports, etc.). The embodiment scans the ecosystems searching for IoT devices and populates an IoT ecosystem data (i.e., database 116) with features, documentation and available SDKs. An IoT framework exists within device component 212 that a) facilitates communication between IoT devices to IoT Orchestration database 406 (see FIG. 4) or other IoT devices and b) extracting device capability/specifications as defined by the manufacturer including API information. The framework will enable IoT device communication by having a thin client installed on each device. The thin client installed on each device will have a capability to make device communication with each other by receiving user's IoT Orchestration feeds from the engine whenever there is a change in user's IoT Orchestration rule/s (e.g., user customized each IoT devices based on certain activities). The meta data about each device configuration is defined by the manufacturer which includes online documentation for the SDK installed on the device. The IoT Orchestration engine 410 (see FIG. 4) will fetch the API information mapped with supported features from the documentation of SDK's for devices (see 401 of FIG. 4).

Figure 4:
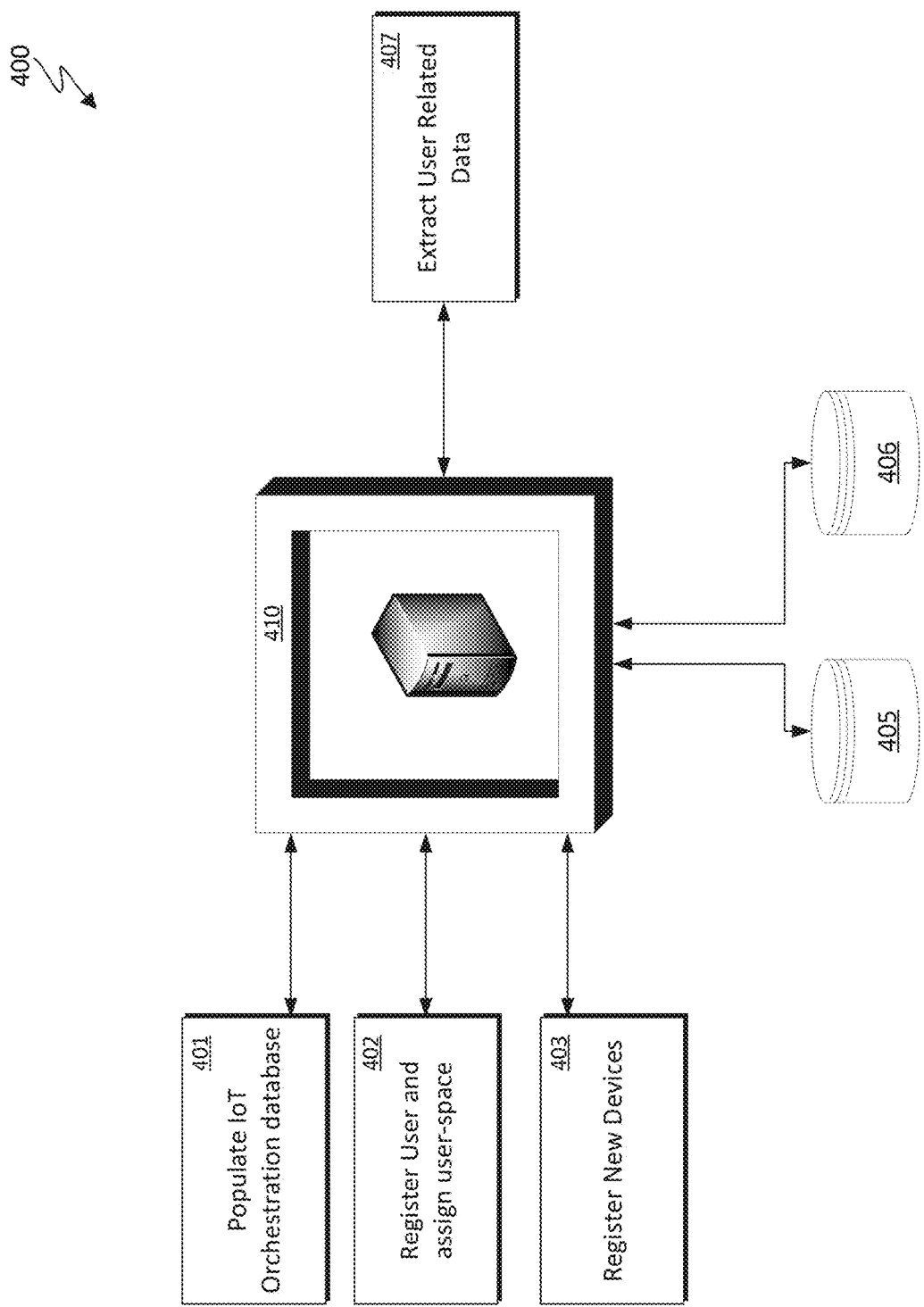
FIG. 4 depicts the IoT framework and relationship between components within the IoT interoperability environment, in accordance with an embodiment of the present invention.

Device component 212 is capable of registering IoT devices for the user where the process is seamless (see 402 and 403 of FIG. 4). For example, when a new user wants to make a use of IoT Orchestration for device-to-device communication, he/she needs to register with the IoT Orchestration Engine. During this process, a separate user-space will be created (by the system) in the IoT Orchestration Database which will be used to store all the registered devices of the user along with desired communication pattern for the user. It is noted that IoT orchestration user-space database (i.e., specific database repository for a specific IoT ecosystem) is not the same as IoT Orchestration database (i.e., prebuilt enterprise-wide IoT integration). For example, use case scenario between User A and User B will be used throughout the disclosure to illustrate functionality of various components and overall system steps. User A and User B has similar IoT devices within their home, Home A and Home B, respectively. Home A can be designated as the first ecosystem and Home B can be designated as the destination ecosystem (compare Home A to Home B wherein Home B is to be updated with Home A's configuration).

Furthermore, when a user adds more IoT devices to the existing ecosystem, device component 212 can validate if the new IoT device can work with the IoT Orchestration engine. For example, User A buys a new IoT thermostat for his home. The thermostat connects to User A's home wireless network. The thermostat tries to connect to the IoT Orchestration engine by sending device ID, model and meta-data. The IoT Orchestration engine determines if the thermostat has been registered by the manufacture (i.e. manufacturer has provided make model, capability, etc.). If the thermostat is valid then the IoT Orchestration engine can extract all necessary data for the device and will populate the IoT Orchestration user-space database 405 (see FIG. 4).

As is further described herein below, relationship component 213, of the present invention provides the capability of comparing two IoT ecosystem and determining the similarity. Relationship component 213 can build a similar model by using the features such as, but it is not limited to, a) sensor used in the ecosystem, b) manufacturer of the sensors and c) other hardware used with the manufacturer details. Based on the features, relationship component 213 builds an embedded representation such as a vector (through neural network's autoencoders). The unique property of the embedding representation is the following: given 2 IoT ecosystems, it maps them to 2 representations (i.e. 300 D or 500 D vector), where cosine distance between the vectors will be very less, if there is high similarity between the 2 IoT ecosystem (i.e. Home A versus Home B) and vice versa. One advantage of using embedding representation is that two or more IoT ecosystems can be compared and the similarity can be derived in scalable manner. It is noted that any embedded representation technique of such as Word2Vec can be used for representation model. Furthermore, any vector comparison techniques (e.g., cosine distance) can be used for comparing two or more vectors to determine similarities.

In other embodiment, relationship component 213 can track the system and user configuration (e.g., User A versus User B) of each IoT ecosystems (e.g., Home A versus Home B) by building relationship graphs. These graphs can correlate use-case scenarios. Relationship component 213 tracks and records user configuration/IoT orchestration with best-practices and create ties between IoT orchestration configurations/best practices with the underlying use-cases and IoT representations. For example, once IoT representation has been trained, the embodiment captures various IoT orchestration related configurations with best practices followed by the user at various time points. Concurrently, embodiment also applies audio, visual and sensor analytics to determine underlying use-case of the user (i.e. user in phone, or user watching tv, user cooking, etc.). Finally, the embodiment creates a relation graph which depicts which IoT orchestrations are related to which use-case and which IoT representations.

As previously mentioned in the disclosure, custom configurations can include the following: i) user's behavior based event pattern, ii) user profile matching based pattern and iii) user-define event pattern. Generally, regarding the definition of user behaviour based event pattern, when a user performs any action via the devices registered with IoT Orchestration Engine, the system will keep a record of sequences of all the actions being performed by the user. All these will be fed to system as an event. The sequence of these events will be used to create probable activity pattern of the user. Once system receives user's events along with their sequence, it will fetch the user's device detail along with supported API's and features from IoT Orchestration database and user-space database. Engine will create a pattern based on the events and sequence and will check if available user's devices and API's are capable for automation of user's event automation. It will send these patterns to user so that he/she can select pattern from these recommended patterns. Along with this, engine will suggest user for other devices which can enable to user to automate more pattern if he/she buys it. For example, User C meets with his client every Monday at 9 AM. The smart phone of User C rings at 9 AM, the User C shuts the door (i.e., IoT sensors detects door closing) and User C shuts off the smart TV.

A user profile matching based pattern can be defined as online activities of the users based. The IoT Orchestration engine will fetch the automated patterns of the connections of the user from social media site having the similar professional and other parameters. Once received, system will fetch the events based on pattern of user-connections from social media sites. For example, based on user's consent/permission, embodiment can collect activities of the User A and B from social media websites, shopping websites and gaming websites.

A user-define event pattern can mean that rules/configuration that the user has create specifically for his ecosystem. The framework will allow user to define his/her own event pattern by using "drag and drop" events from user-space IoT database which has information about all the devices of user along with its API's and capability. For example, a user behavior based pattern can be User A programming his smart TV in the bedroom to turn on at 7 AM so he can watch the news while getting ready for work. Or conversely, a programmable event such as turning off or muting the volume of the smart TV when User A's phone rings while User A is in the same vicinity of the TV.

As is further described herein below, analysis component 214 of the present invention provides, in real time, the capability of determining similarities of the compared ecosystems (e.g., Home A versus Home B) and transferring configuration between the ecosystems. The embodiment monitors user's current use-case in the backend and retrieves top-k similar use-cases (executed by other users in past) and top-k similar IoT ecosystems (not belonging to the user). The monitoring process occurs dynamically and continuously (i.e., scanning the ecosystems of changes to devices and/or rules). The monitoring process transpires in a scalable way as it is executed in vector space as ecosystems are converted to embedding representations. Thus, analysis component 214 can use exiting techniques known in the art, such as, computing Euclidian distance. Based on the distances, the similarity scores (between the ecosystems) could be established (i.e., instant fast discovery of Top-K similar representations). Vector comparison techniques such as cosine similarities (i.e. calculation) can be used to establish the similar score index between the two ecosystems.

If there is a strong match (i.e., similarities based on score index) between (i) user's current use-case with the discovered use-cases and (ii) User's IoT ecosystem with the IoT ecosystems underlying the discovered use-cases, analysis component 214 performs the following steps: a) IoT component 111 determines if user's IoT orchestrations could be improved using the discovered IoT ecosystem by leveraging relation graph inferred from relationship component 212 and b) if user's IoT orchestration could be improved then the modules can initiate an auto transferred to users (with user consent). It is noted that, not all IoT orchestration configurations/best-practices will be ported. The configurations which best match to the user's use-case at a point in time and space having very high use-case and ecosystem match will only be ported. Thus, chances of false negatives can be reduced.

As is further described herein below, action component 215 of the present invention provides the capability of generating UI (user interface) with the user and transferring data between IoT ecosystem. Action component 215 can generate different UI window/screens to allow user interaction with the IoT component 111. For example, action component 215 can generate a list of similar IoT ecosystems that are similar to the user's IoT ecosystem and prompts the user to pick one IoT ecosystem to transfer data. It is noted that it's possible that only one IoT ecosystem may appear on the list for the user to select instead of multiple options. In another example, action component 215 can generate a UI screen prompting user to modify and/or customize their IoT ecosystem for users with advance knowledge of IoT framework and device configuration.

Action component 215 can transfer data from one IoT ecosystem to the user's IoT ecosystem based on the user's selection from the UI screen. For example, action component 215 can accept a user's selection ("ACCEPT TRANSFER") and being to copy the data from the source IoT ecosystem to the target IoT ecosystem (i.e., belonging to the user). Furthermore, action component 215 can begin to configure the target IoT ecosystem based on the copied data from the source IoT ecosystem.

Figure 3:
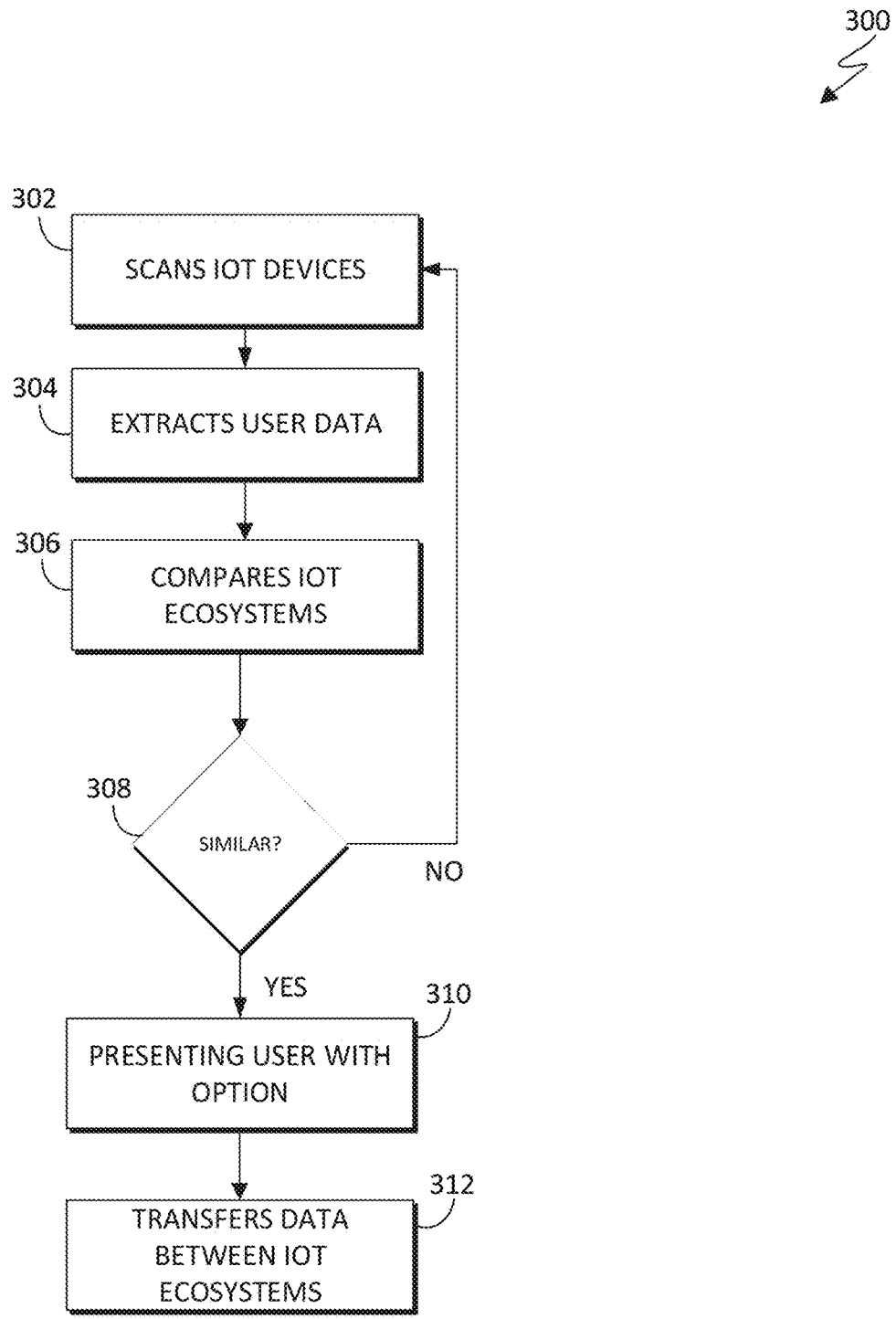
FIG. 3 is a flowchart illustrating the operation of an IoT interoperability system, designated as 300, in accordance with an embodiment of the present invention.

FIG. 3 is a flowchart illustrating the operation of an IoT interoperability environment 100, designated as 300, in accordance with an embodiment of the present invention.

IoT component 111 scans IoT devices with the ecosystems (step 302). In an embodiment, IoT component 111, through devices component 212, scans for IoT devices to populate/register within the IoT orchestration user-space database (i.e., 405). For example, IoT component 111 receives a request from User B to find best practices (configuration) for Home B. IoT component 111 takes inventory of available IoT devices at User B's home and registers and populates (i.e. saving) the data in the database (e.g., 116 or 405). IoT component 111 searches for a similar IoT ecosystems, scans Home A of User A (with permission/consent).

IoT component 111 extracts user data (step 304). In an embodiment, IoT component 111 through relationship component 213 extracts user data such as a) user behavior based on an event pattern, b) user's profile based on pattern and c) user's defined event pattern. For example, IoT component 111 extracts social media preference/habits of both User A and User B (after consent). In another example, IoT component 111 observes and learns the pattern of User C who has weekly calls from his house every Monday at 9 AM.

IoT component 111 compares IoT ecosystems (step 306). In an embodiment, IoT component 111 through analysis component 214 compares one or more ecosystems to determine if both (assuming comparing one versus another) ecosystems. For example, IoT component 111 creates a model (via Word2Vec) of each ecosystem (e.g., Home A versus Home B) and performs vector analysis. The analysis yields a numerical result of 0.6 (i.e., score index) between the two vectors.

IoT component 111 determines if the score (i.e., score index) is above a threshold (decision block 308). In an embodiment, if the numerical value of the comparison is 0.6 then IoT component proceeds to step 310 ("YES" branch, decision block 308). However, if the score is below 0.6 then IoT component 111 cannot proceed to transfer the configuration between the two ecosystems and returns to step 302 ("No" branch, decision block 308). Thus, IoT component 111 would search for another IoT ecosystem and begin an iterative process of searching and matching ecosystems for User B. It is noted that the threshold for comparison can be set by the system or system administrator (i.e., human).

IoT component 111 presents user with option (step 310). In an embodiment, IoT component 111, through action component 215, presents the user (via UI screen) with an option to accept the matching (i.e., similar) IoT ecosystem. The user can choose to accept or ignore (i.e., keep finding another similar IoT ecosystem). For example, IoT component 111 determines that the ecosystem of User A and User B are similar and presents that option to the User A via a UI screen.

Action component 215 can begin to transfer and configure the IoT ecosystem belonging to the user if the user accepts the selected option (from the UI screen). It is noted that this step can occur automatically without any human interaction.

IoT component 111 transfers data between ecosystems (step 312). In an embodiment, IoT component 111, through action component 215, transfers the configuration from one IoT ecosystems to another. For example, IoT component 111 determines that the ecosystem of User A and User B are similar, proceeds to transfer configuration from Home A to Home B after user accept Home A from the UI screen.

FIG. 4 depicts the IoT framework and relationship between components within the IoT interoperability environment 100, designated as 400, in accordance with an embodiment of the present invention. Environment 400 includes component 401, 402, 403, IoT Orchestration Engine, IoT Orchestration user-space database 405, IoT Orchestration database 406 and component 407. This framework provides a model to enable spatio-temporal transfer learning between IoT ecosystems for user's IoT device automation based on IoT embedding representation similarities (with other users). It is noted that some of the components and processes within the 400 environments may have already been discussed with respect to FIG. 2.

401 depicts the process of populating IoT orchestration database 406 with IoT devices (i.e., 102). The meta data about each device configuration is defined by manufacturer which includes online documentation for the SDK installed on the device. IoT Orchestration engine 410 will fetch API information mapped with supported features from the documentation of SDK's for devices.

402 depicts the process or registering user and assigning user space (i.e., 405). When a new user wants to make a use of IoT Orchestration for Device to Device communication, he/she needs to register with IoT Orchestration Engine 410. During this process, A separate user-space will be created in the IoT Orchestration Database 406 which will be used to store all the registered devices of the user along with desired communication pattern for the user.

403 depicts the process of registering new devices (i.e., 102). When a user buys a new device, he/she will register it with IoT Orchestration Engine 410 so that it can be a part of user's IoT Orchestration system and device can be used to send/receive activity based instructions to other devices. Since IoT Orchestration database 406 has been populated with supported devices, IoT component 111 will check if device can be a part of user's IoT Orchestration system. IoT Orchestration engine 410 will populate user's user-space on IoT Orchestration database 405 with user's devices, supported API's and their capabilities.

407 depicts the process of extracting user related data (e.g., user events, etc.) IoT Orchestration engine 410 will enable user to create user's IoT Orchestration based on spatio-temporal transfer learning between IoT ecosystems considering event similarities fed by user behaviour based event pattern, user's profile matching (with other users) based pattern and user's own defined event pattern. IoT Orchestration engine 410 will fetch all the devices registered by user along with their API's and supported features from IoT Orchestration user-space database 405. IoT Orchestration engine 10 will auto discover appropriate IoT orchestration configs by using a scalable IoT fine-tuned representation similarity computation based on (a) user behavior based event pattern (b) other user's profile based pattern (c) user defined event pattern. Once this is populated in user-space of user, user device's thin client will be updated with user's IoT event execution rules so that devices can interact with each other based on these events.

Figure 5:
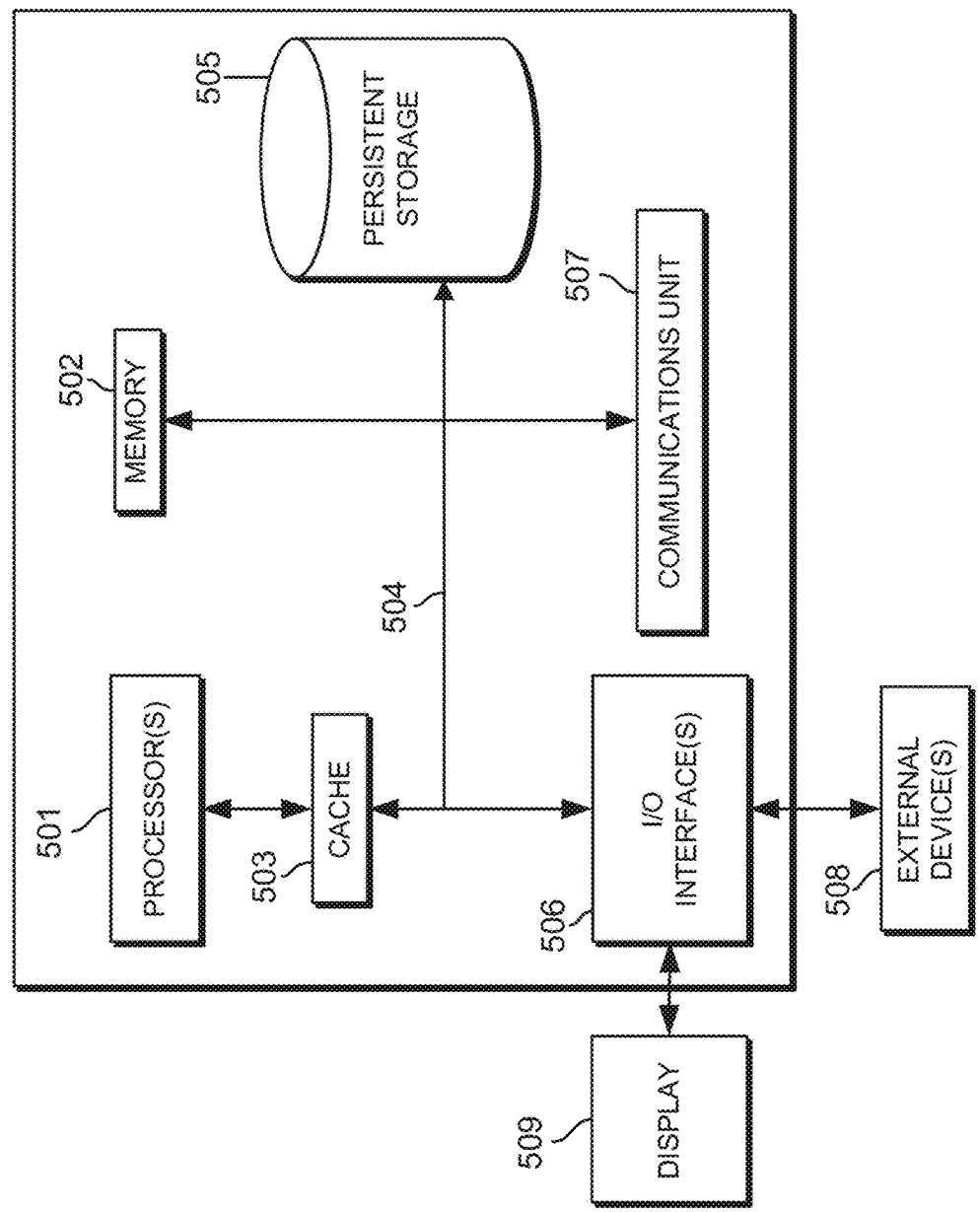
FIG. 5 depicts a block diagram, designated as 500, of components of a server computer capable of executing the IoT interoperability system within the IoT interoperability environment, of FIG. 1, in accordance with an embodiment of the present invention.

FIG. 5 depicts a block diagram of components of IoT component 111 application, designated as 500, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

FIG. 5 includes processor(s) 501, cache 503, memory 502, persistent storage 505, communications unit 507, input/output (I/O) interface(s) 506, and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data (e.g., software and data x10) used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. IoT component 111 can be stored in persistent storage 505 for access and/or execution by one or more of the respective processor(s) 501 via cache 503.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data (e.g., IoT component 111) used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Program instructions and data (e.g., IoT component 111) used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for transferring configuration between IoT ecosystems, the method comprising:
  scanning a first set of IoT devices from a first IoT ecosystem and saving a first scanned data;
  scanning a second set of IoT devices from a second IoT ecosystem and saving a second scanned data;
  extracting the first scanned data and the second scanned data, wherein the first scanned data and the second scanned data comprises of behavior data of a user, profile of the user and pattern events defined by the user;
  comparing the first IoT ecosystem against the second IoT ecosystem based on the first scanned data and the second scanned data by creating a score index;
  determining if the score index exceeds a threshold;
  responsive to the score index exceeding the threshold, presenting a user of the second ecosystems with an option to accept the first scanned data; and
  responsive to the user accepting, transferring the first scanned data to the second IoT ecosystem.

2. The computer-implemented method of claim 1, wherein scanning IoT devices from the first and second IoT ecosystems further comprises:
retrieving a first IoT specifications from a first IoT Orchestration database associated with the first IoT ecosystems; and
retrieving a second IoT specifications from a second IoT Orchestration database associated with the second IoT ecosystems.

3. The computer-implemented method of claim 1, wherein creating the score index further comprises:
representing the first IoT ecosystem with a first vector by using Word2Vec;
representing the second IoT ecosystems with a second vector by using the Word2Vec; and
determining a similarity between the first vector against the second vector by using cosine similarity calculation.

4. The computer-implemented method of claim 3, wherein determining the score index exceed the threshold further comprises:
comparing the cosine similarity associated with the first and second vector against a threshold.

5. The computer-implemented method of claim 1, wherein presenting the user with the option further comprises:
generating a first UI (user interface) window outlining the similarity between the two ecosystems and listing the first IoT devices and the second IoT devices; and
generating a second UI window with a prompt asking the user to accept the first ecosystem.

6. The computer-implemented method of claim 1, wherein transferring the first scanned data to the second data further comprises:
copying the first scanned data to a second database associated with the second IoT ecosystem; and
configuring the second IoT ecosystem with the copied data from the second database.

7. The computer-implemented method of claim 1, wherein the first set of IoT devices and the second set of IoT devices further comprises of a smart lighting, a smart thermostat, a door lock device and a home automation related device.

8. A computer program product for multi-sprint backlog management, the computer program product comprising:
one or more computer readable storage media and program instructions stored on the one or more computer readable storage media, the program instructions comprising:
program instructions to scan a first set of IoT devices from a first IoT ecosystem and saving a first scanned data;
program instructions to scan a second set of IoT devices from a second IoT ecosystem and saving a second scanned data;
program instructions to extract the first scanned data and the second scanned data wherein the first scanned data and the second scanned data comprises of behavior data of a user, profile of the user and pattern events defined by the user;
program instructions to compare the first IoT ecosystem against the second IoT ecosystem based on the first scanned data and the second scanned data by creating a score index;
program instructions to determine if the score index exceeds a threshold;
responsive to the score index exceeding the threshold, program instructions to present a user of the second ecosystems with an option to accept the first scanned data; and
responsive to the user accepting, program instructions to transfer the first scanned data to the second IoT ecosystem.

9. The computer program product of claim 8, wherein scanning IoT devices from the first and second IoT ecosystems further comprises:
program instructions to retrieve a first IoT specifications from a first IoT Orchestration database associated with the first IoT ecosystems; and
program instructions to retrieve a second IoT specifications from a second IoT Orchestration database associated with the second IoT ecosystems.

10. The computer program product of claim 8, wherein creating the score index further comprises:
program instructions to represent the first IoT ecosystem with a first vector by using Word2Vec;
program instructions to represent the second IoT ecosystems with a second vector by using the Word2Vec; and
program instructions to determine a similarity between the first vector against the second vector by using cosine similarity calculation.

11. The computer program product of claim 10, wherein determining the score index exceed the threshold further comprises:
program instructions to compare the cosine similarity associated with the first and second vector against a threshold.

12. The computer program product of claim 8, wherein presenting the user with the option further comprises:
program instructions to generate a first UI (user interface) window outlining the similarity between the two ecosystems and listing the first IoT devices and the second IoT devices; and
program instructions to generate a second UI window with a prompt asking the user to accept the first ecosystem.

13. The computer program product of claim 8, wherein transferring the first scanned data to the second data further comprises:
program instructions to copy the first scanned data to a second database associated with the second IoT ecosystem; and
program instructions to configure the second IoT ecosystem with the copied data from the second database.

14. The computer program product of claim 8, wherein the first set of IoT devices and the second set of IoT devices further comprises of a smart lighting, a smart thermostat, a door lock device and a home automation related device.

15. A computer system for multi-sprint backlog management, the computer system comprising:
one or more computer processors;
one or more computer readable storage media; and
program instructions stored on the one or more computer readable storage media for execution by at least one of the one or more computer processors, the program instructions comprising:
program instructions to scan a first set of IoT devices from a first IoT ecosystem and saving a first scanned data;
program instructions to scan a second set of IoT devices from a second IoT ecosystem and saving a second scanned data;

program instructions to extract the first scanned data and the second scanned data wherein the first scanned data and the second scanned data comprises of behavior data of a user, profile of the user and pattern events defined by the user;

program instructions to compare the first IoT ecosystem against the second IoT ecosystem based on the first scanned data and the second scanned data by creating a score index;

program instructions to determine if the score index exceeds a threshold;

responsive to the score index exceeding the threshold, program instructions to present a user of the second ecosystems with an option to accept the first scanned data; and responsive to the user accepting, program instructions to transfer the first scanned data to the second IoT ecosystem.

16. The computer system of claim 15, wherein scanning IoT devices from the first and second IoT ecosystems further comprises:

program instructions to retrieve a first IoT specifications from a first IoT Orchestration database associated with the first IoT ecosystems; and program instructions to retrieve a second IoT specifications from a second IoT Orchestration database associated with the second IoT ecosystems.

17. The computer system of claim 15, wherein creating the score index further comprises:

program instructions to represent the first IoT ecosystem with a first vector by using Word2Vec;

program instructions to represent the second IoT ecosystems with a second vector by using the Word2Vec; and program instructions to determine a similarity between the first vector against the second vector by using cosine similarity calculation.

18. The computer system of claim 17, wherein determining the score index exceed the threshold further comprises:

program instructions to compare the cosine similarity associated with the first and second vector against a threshold.

19. The computer system of claim 15, wherein presenting the user with the option further comprises:

program instructions to generate a first UI (user interface) window outlining the similarity between the two ecosystems and listing the first IoT devices and the second IoT devices; and program instructions to generate a second UI window with a prompt asking the user to accept the first ecosystem.

20. The computer system of claim 15, wherein transferring the first scanned data to the second data further comprises:

program instructions to copy the first scanned data to a second database associated with the second IoT ecosystem; and program instructions to configure the second IoT ecosystem with the copied data from the second database.

* * * * *